(12) United States Patent
Takayama

(10) Patent No.: US 7,733,412 B2
(45) Date of Patent: Jun. 8, 2010

(54) IMAGE PICKUP APPARATUS AND IMAGE PICKUP METHOD

(75) Inventor: Masahiro Takayama, Shinagawa-ku (JP)

(73) Assignee: Canon Kabushiki Kaisha (JP)

( * ) Notice: Subject to any disclaimer, the term of this patent is extended or adjusted under 35 U.S.C. 154(b) by 970 days.

(21) Appl. No.: 11/145,355

(22) Filed: Jun. 3, 2005

(65) Prior Publication Data

US 2005/0270410 A1   Dec. 8, 2005

(30) Foreign Application Priority Data

Jun. 3, 2004   (JP)   ............................. 2004-166342

(51) Int. Cl.
*G03B 13/00*   (2006.01)
(52) U.S. Cl. ..................................... 348/349
(58) Field of Classification Search ................ 348/348, 348/345, 349, 353, 354, 356
See application file for complete search history.

(56) References Cited

U.S. PATENT DOCUMENTS

| 2001/0035910 A1 | 11/2001 | Yukawa | |
| 2003/0156838 A1* | 8/2003 | Ikeda et al. | 396/564 |
| 2004/0207743 A1 | 10/2004 | Nozaki et al. | |
| 2004/0257461 A1 | 12/2004 | Toyomura | |
| 2005/0001924 A1* | 1/2005 | Honda | 348/348 |
| 2005/0052563 A1 | 3/2005 | Yasuda | |

FOREIGN PATENT DOCUMENTS

| JP | 3164692 B2 | 3/2001 |
| JP | 2001-281529 A | 10/2001 |
| JP | 2002-318341 A | 10/2002 |
| JP | 2003-75717 A | 3/2003 |
| JP | 2004-070038 A | 3/2004 |
| JP | 2004-144939 A | 5/2004 |
| JP | 2004-151183 A | 5/2004 |
| JP | 2004-198631 A | 7/2004 |
| JP | 2004-320287 A | 11/2004 |
| JP | 2005-84426 A | 3/2005 |

* cited by examiner

*Primary Examiner*—David L Ometz
*Assistant Examiner*—Dillon Durnford-Geszvain
(74) *Attorney, Agent, or Firm*—Rossi, Kimms & McDowell LLP

(57) ABSTRACT

An image pickup apparatus which can reduce the time required for automatic focus scanning. The size of the face is determined based on information on a subject's face, which is detected from image data acquired by shooting by an image pickup device. The subject distance is estimated based on the determined size of the face. The depth of field is calculated. A range over which the focus lens is driven varies according to the estimated subject distance and the calculated depth of field.

14 Claims, 13 Drawing Sheets

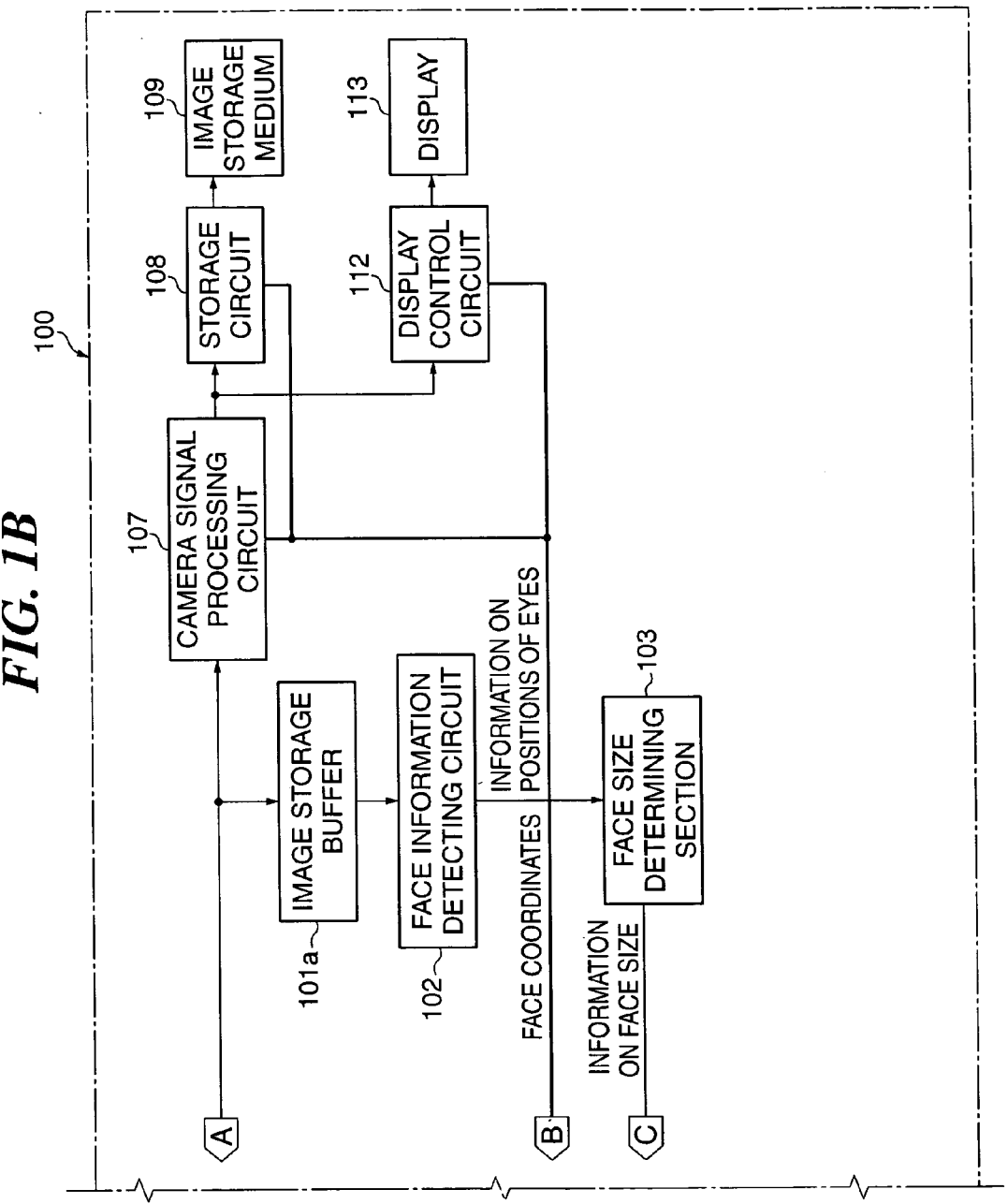

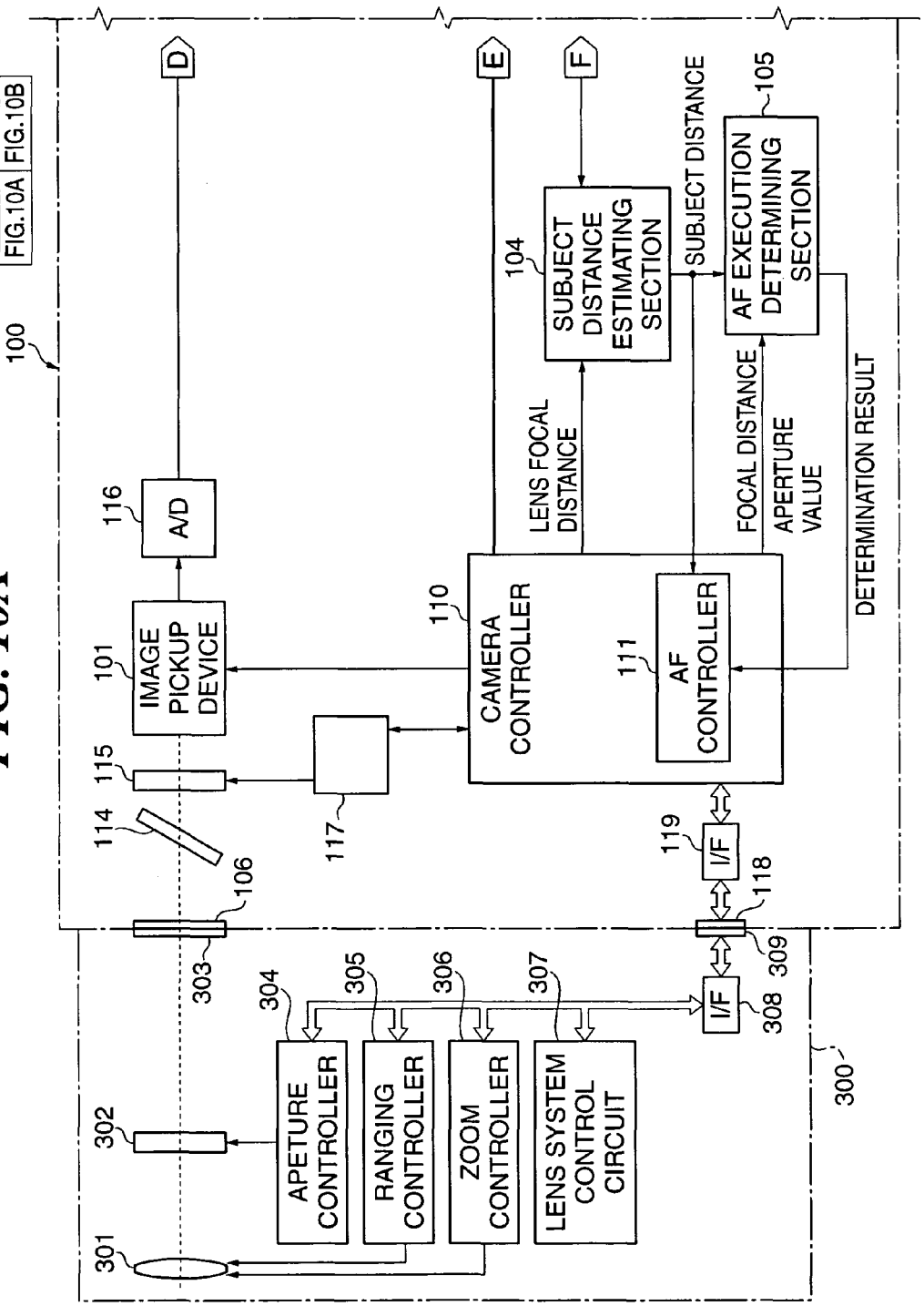

IMAGE PICKUP APPARATUS AND IMAGE PICKUP METHOD

BACKGROUND OF THE INVENTION

1. Field of the Invention

The present invention relates to an image pickup apparatus and an image pickup method. In particular, the present invention relates to an image pickup apparatus with an automatic focusing function and an image pickup method.

2. Description of the Related Art

An image pickup apparatus with an automatic focusing (AF) function performs automatic focusing by converting the contrast of a subject image formed on a CCD into an electric signal, amplifying the electric signal using a highpass filter (HPF), analyzing the waveform of the amplified electric signal, and focusing on the subject according to the analysis result.

Specifically, in consideration of the fact that the waveform of the amplified electric signal is gentle when the image pickup apparatus is not focused on the subject, and the waveform of the magnified electric signal is steep when the image pickup apparatus is focused on the subject, the image pickup apparatus is adapted to move the lens to a position where the waveform becomes steepest is obtained among a plurality of shot subject images in driving the lens.

In the above automatic focusing, normally a central part or a plurality of areas on the CCD plane are set as a ranging area.

The conventional image pickup apparatus with the automatic focusing (AF) function detects the distance to the whole face of a person as a subject set as the ranging area and adjusts the focal position, lens focal distance, and aperture value so that the detected distance to the subject can be within the depth of field. An example of the conventional image pickup apparatus is described in Japanese Patent Publication No. 3164692.

Here, the depth of field is the range in the direction of depth over which a sharp image of the subject can be produced (focusing range). The depth of field varies according to the distance from the image pickup apparatus to the subject, lens focal distance, and aperture value. When the distance from the image pickup apparatus to the subject is long, the lens focal distance is short, and the aperture value is large, the image pickup apparatus can produce a sharp image of the subject without performing automatic focusing because the distance from the image pickup apparatus to the subject is within the depth of field.

Another conventional image pickup apparatus is provided with a distance detecting device which detects the distance from the image pickup apparatus to a subject based on the size of an area occupied by the subject on a shooting screen on which a shot subject image is formed. An example of this image pickup apparatus is described in Japanese Laid-Open Patent Publication (Kokai) No. 2003-75717.

However, the above conventional image pickup apparatuses use the same automatic focusing method irrespective of whether automatic focusing is required or not, and therefore cannot accurately perform automatic focusing and reduce the time required for automatic focus scanning in automatic focusing.

SUMMARY OF THE INVENTION

The present invention has been made in consideration of the above situation, and its object is to provide an image pickup apparatus and an image pickup method which can reduce the time required for automatic focus scanning.

To attain the above object, in a first aspect of the present invention, there is provided an image pickup apparatus comprising an image pickup device that shoots a subject to acquire image data on the subject, a controller that drivingly controls a focus lens to cause the image pickup device to perform automatic focusing, a face information detecting device that detects information on a face of the subject from the acquired image data, a distance estimating device that estimates a subject distance from the image pickup device to the subject based on the detected information on the face, and a depth-of-field calculating device that calculates a depth of field, wherein a range over which the focus lens is driven varies according to the estimated subject distance and the calculated depth of field.

Preferably, the range over which the focus lens is driven includes a position of the focus lens at which the focus lens is focused at the estimated subject distance, and is wider as the depth of field is larger and is narrower as the depth of field is smaller.

Preferably, the controller controls a range of movement of the focus lens according to the depth of field.

Preferably, the controller provides control such that at and in a vicinity of a position of the focus lens at which the focus lens is focused at the estimated subject distance, a range over which the focus lens moves is made smaller.

Preferably, the controller inhibits execution of the automatic focusing when the estimated subject distance is within a focusing range under shooting conditions in acquiring the image data from which the information on the face has been detected.

To attain the above object, in a second aspect of the present invention, there is provided an image pickup apparatus comprising an image pickup device that shoots a subject to acquire image data on the subject, a controller that drivingly controls a focus lens to cause the image pickup device to perform automatic focusing, a face information detecting device that detects information on a face of the subject from the acquired image data, a distance estimating device that estimates a subject distance from the image pickup device to the subject based on the detected information on the face, and a depth-of-field calculating device that calculates a depth of field, wherein the controller provides control such that a range of movement of the focus lens varies according to the estimated subject distance and the calculated depth of field.

Preferably, the controller provides control such that at and in a vicinity of a position of the focus lens at which the focus lens is focused at the estimated subject distance, a range over which the focus lens moves is made smaller.

Preferably, the controller inhibits execution of the automatic focusing when the estimated subject distance is within a focusing range under shooting conditions in acquiring the image data from which the information on the face has been detected.

To attain the above object, in a third aspect of the present invention, there is provided an image pickup apparatus comprising an image pickup device that shoots a subject to acquire image data on the subject, a controller that drivingly controls a focus lens to cause the image pickup device to perform automatic focusing, a face information detecting device that detects information on a face of the subject from the acquired image data, a distance estimating device that estimates a subject distance from the image pickup device to the subject based on the detected information on the face, and a depth-of-field calculating device that calculates a depth of field based on the estimated subject distance, wherein the controller provides control such that a range of movement of the focus lens varies according to a result of the calculation carried out by the depth-of-field calculating device.

To attain the above object, in a fourth aspect of the present invention, there is provided an image pickup apparatus comprising an image pickup device that shoots a subject to acquire image data on the subject, a controller that drivingly controls a focus lens to cause the image pickup device to perform automatic focusing, a face information detecting device that detects information on a face of the subject from the acquired image data, a distance estimating device that estimates a subject distance from the image pickup device to the subject based on the detected information on the face, and a depth-of-field calculating device that calculates a depth of field based on a focal point distance at which the image data from which the information on the face has been detected was acquired, wherein a range of movement of the focus lens varies according to a result of the calculation carried out by the depth-of-field calculating device.

To attain the above object, in a fifth aspect of the present invention, there is provided an image pickup apparatus comprising an image pickup device that shoots a subject to acquire image data on the subject, a controller that drivingly controls a focus lens to cause the image pickup device to perform automatic focusing, a face information detecting device that detects information on a face of the subject from the acquired image data, a distance estimating device that estimates a subject distance from the image pickup device to the subject based on the detected information on the face, and a depth-of-field calculating device that calculates a depth of field based on the estimated subject distance, wherein the controller inhibits execution of the automatic focusing when a focal point distance at which the image data from which the information on the face has been detected was acquired is within the calculated depth of field.

To attain the above object, in a sixth aspect of the present invention, there is provided an image pickup apparatus comprising an image pickup device that shoots a subject to acquire image data on the subject, a controller that drivingly controls a focus lens to cause the image pickup device to perform automatic focusing, a face information detecting device that detects information on a face of the subject from the acquired image data, a distance estimating device that estimates a subject distance from the image pickup device to the subject based on the detected information on the face, and a depth-of-field calculating device that calculates a depth of field based on a focal point distance at which the image data from which the information on the face has been detected was acquired, wherein the controller inhibits execution of the automatic focusing when the estimated subject distance is within the calculated depth of field.

To attain the above object, in a seventh aspect of the present invention, there is provided an image pickup method comprising an automatic focusing executing step of causing an image pickup device that shoots a subject to acquire image data on the subject to perform automatic focusing by driving a focus lens, a face information detecting step of detecting information on a face of the subject from the acquired image data, a distance estimating step of estimating a subject distance from the image pickup device to the subject based on the detected information on the face; and a calculating step of calculating a depth of field, wherein a range over which the focus lens is driven varies according to the estimated subject distance and the calculated depth of field.

To attain the above object, in an eighth aspect of the present invention, there is provided an image pickup method comprising a control step of causing an image pickup device that shoots a subject to acquire image data on the subject to perform automatic focusing by driving a focus lens, a face information detecting step of detecting information on a face of the subject from the acquired image data, a distance estimating step of estimating a subject distance from the image pickup device to the subject based on the detected information on the face, and a calculating step of calculating a depth of field, wherein the control step comprises providing control such that a range of movement of the focus lens varies according to the estimated subject distance and the calculated depth of field.

To attain the above object, in a ninth aspect of the present invention, there is provided an image pickup method comprising a control step of causing an image pickup device that shoots a subject to acquire image data on the subject to perform automatic focusing by driving a focus lens, a face information detecting step of detecting information on a face of the subject from the acquired image data, a distance estimating step of estimating a subject distance from the image pickup device to the subject based on the detected information on the face, and a calculating step of calculating a depth of field based on the estimated subject distance, wherein a range of movement of the focus lens varies according to a result of computation carried out in the calculating step.

To attain the above object, in a tenth aspect of the present invention, there is provided an image pickup method comprising a control step of causing an image pickup device that shoots a subject to acquire image data on the subject to perform automatic focusing by driving a focus lens, a face information detecting step of detecting information on a face of the subject from the acquired image data, a distance estimating step of estimating a subject distance from the image pickup device to the subject based on the detected information on the face, and a calculating step of calculating a depth of field based on a focal point distance at which the image data from which the information on the face has been detected was acquired, wherein a range of movement of the focus lens varies according to a result of the calculation carried out in the calculating step.

To attain the above object, in an eleventh aspect of the present invention, there is provided an image pickup method comprising a control step of causing an image pickup device that shoots a subject to acquire image data on the subject to perform automatic focusing, a face information detecting step of detecting information on a face of the subject from the acquired image data, a distance estimating step of estimating a subject distance from the image pickup device to the subject based on the detected information on the face, and a calculating step of calculating a depth of field based on the estimated subject distance, wherein execution of the automatic focusing is inhibited when a focal point distance at which the image data from which the information on the face has been detected was acquired is within the calculated depth of field.

To attain the above object, in a twelfth aspect of the present invention, there is provided an image pickup method comprising a control step of causing an image pickup device that shoots a subject to acquire image data on the subject to perform automatic focusing, a face information detecting step of detecting information on a face of the subject from the acquired image data, a distance estimating step of estimating a subject distance from the image pickup device to the subject based on the detected information on the face, and a calculating step of calculating a depth of field based on a focal point distance at which the image data from which the information on the face has been detected was acquired, wherein execution of the automatic focusing is inhibited when the estimated subject distance is within the calculated depth of field.

According to the present invention, the time required for automatic focus scanning can be reduced.

The other objects, features, and advantages of the present invention will apparent from the following detailed description taken in conjunction with the accompanying drawings, in which like reference characters designate the same or similar elements or parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 1A and 1B are block diagrams schematically showing the construction of an image pickup apparatus according to a first embodiment of the present invention;

FIGS. 10A and 10B are block diagrams schematically showing the construction of an image pickup apparatus according to a second embodiment of the present invention;

DETAILED DESCRIPTION OF THE PREFERRED EMBODIMENTS

Preferred embodiments of the present invention will be described in detail with reference to the accompanying drawings. However, the dimensions, materials, shapes and relative positions of the constituent parts shown in the embodiments should be changed as convenient depending on various conditions and on the structure of the apparatus adapted to the invention, and the invention is not limited to the embodiments described herein.

Figure 1A:
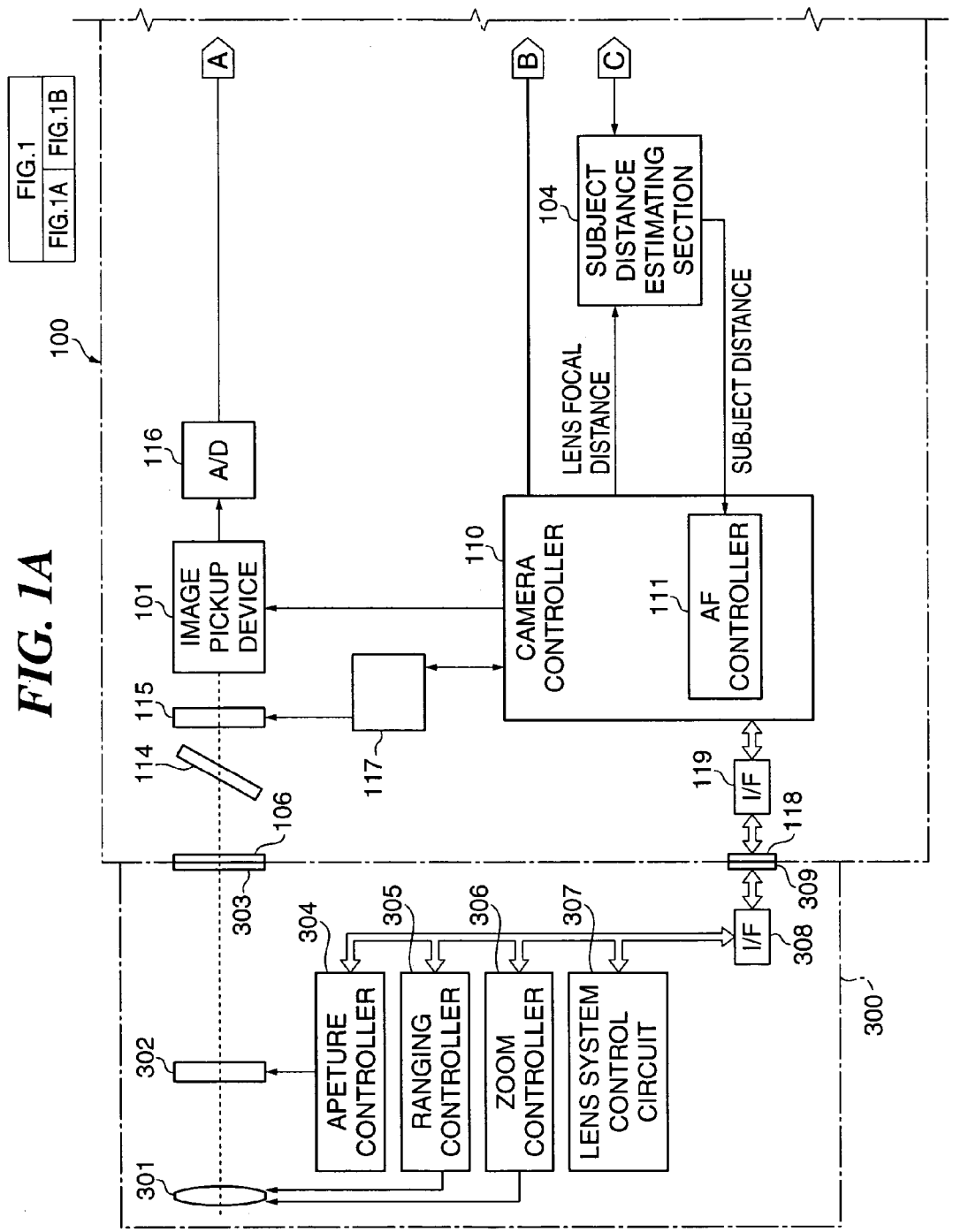

FIGS. 1A and 1B are block diagrams schematically showing the construction of an image pickup apparatus according to a first embodiment of the present invention.

As shown in FIGS. 1A and 1B, the image pickup apparatus 100 is comprised of an image pickup device 101 which shoots a person as a subject and outputs image data, an A/D converter 116 which converts analogue signals output from the image pickup device 101 into digital signals (image data), an image storage buffer 101a which stores the image data output from the image pickup device 101, a face information detecting circuit 102 which detects information on a subject's face (such as positions of the eyes and coordinates of the face) from the image data acquired from the image storage buffer 101a, a face size determining section 103 which determines the face size based on the detected information on the subject's face, a camera controller 110 (automatic focusing means) which causes the image pickup device 101 to perform automatic focusing and outputs a lens focal distance and an aperture value, a subject distance estimating section 104 which estimates the subject distance from the image pickup device 101 to the subject based on the face size (face size information) determined by the face size determining section 103 and the lens focal distance output from the camera controller 110. The camera controller 110 which calculates the depth of field based on the subject distance estimated by the subject distance estimating section 104 and the lens focal distance and the aperture value output from the camera controller 110. The camera controller 110 has a built-in automatic focusing (AF) controller 111 (automatic focusing control means) which controls automatic focusing of the image pickup device 101. Also, the camera controller 110 is provided with an exposure (AF) controller, etc., not shown, to provide exposure control as well as automatic focusing control as mentioned above, thus controlling the overall shooting operation of the image pickup apparatus 100.

Incident light on a taking lens 301 including a zoom lens and a focus lens in a lens unit 300 is led to the image pickup device 101 via an aperture 302, lens mounts 303 and 106, a mirror 114, and a shutter 115, where the light is focused as an optical image. A shutter controller 117 drivingly controls the shutter 115 in cooperation with an aperture controller 304 which drivingly controls the aperture 302 based on photometric information. A ranging controller 305 controls the focusing of the taking lens 301 based on a control signal output from the camera controller 110. A zoom controller 306 controls the zooming of the taking lens 301. A lens system control circuit 307 controls the whole lens unit 300. The lens system control circuit 307 is provided with functions of a memory which stores constants, variables, and programs for operations, and a nonvolatile memory which stores identification information such as a number unique to the lens unit 300, control information, functional information such as wide open aperture value, minimum aperture value, and focal distance, and various present and past set values. An interface 308 connects the lens unit 300 to the image pickup apparatus 100 on the lens unit 300 side. Connectors 309 and 118 electrically connect the lens unit 300 to the image pickup apparatus 100. An interface 119 connects the image pickup apparatus 100 to the lens unit 300 on the image pickup apparatus 100 side.

A camera signal processing circuit 107 carries out signal processing necessary for shot image data. An image storage medium 109 is removable from the image pickup device 101. A storage circuit 108 stores the image data subjected to signal processing in the image storage medium 109. A display 113 displays the image data subjected to signal processing. A display control circuit 112 controls the display 113.

Since the image pickup apparatus 100 is characterized by its automatic focusing function, description of the exposure (AE) controller, etc. of the camera controller 110 is omitted.

The face information detecting circuit 102 carries out a pattern recognition process, described later with reference to FIG. 5, to detect face information from image data. In addition to a method using the pattern recognition, a number of methods may be used to detect the image data on the face; e.g. a method in which learning is carried out using a neural network or the like, a method in which a characteristic area of a physical shape is detected from an image area, and a method in which image feature values of detected face skin color and eye shape are statistically analyzed. Also, as an example of methods expected to be put into practical use, there is a method using wavelet transform and image feature values.

Here, the pattern recognition is a process in which an extracted pattern is matched with one of concepts (classes) determined in advance (matching). Template matching is a method in which an image is compared with a template which means a pattern paper while the template is being moved over the image; for example, the template matching is used for "detecting the position of an object", "tracking a moving object", "aligning images shot at different times", and so forth and is particularly useful for detecting face information by extracting physical shapes such as eyes and nose from an image area.

The face size determining section 103 counts pixels in a face area (face coordinates) from the face information detected by the face information detecting circuit 102 and determines the face size based on the counted number of pixels.

Figure 2:
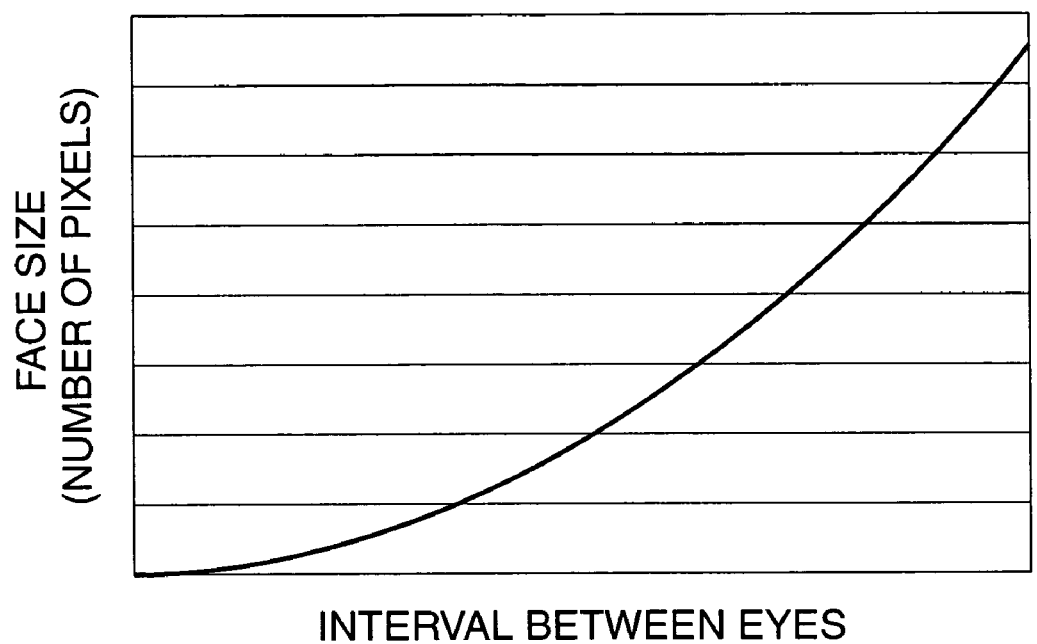
FIG. 2 is a graph showing the relationship between the interval between the eyes and the size of a face as information detected by a face information detecting circuit appearing in FIGS. 1A and 1B.

The face size determining section 103 may determine the face size by calculating the interval between the eyes based on the face information (positions of the eyes) detected by the face information detecting circuit 102 and referring to a table showing the statistical relationship between the interval between the eyes and the face size (number of pixels) obtained in advance (FIG. 2), or by counting pixels in the face area based on coordinate values at four corners (predetermined positions) of the face.

Figure 3B:
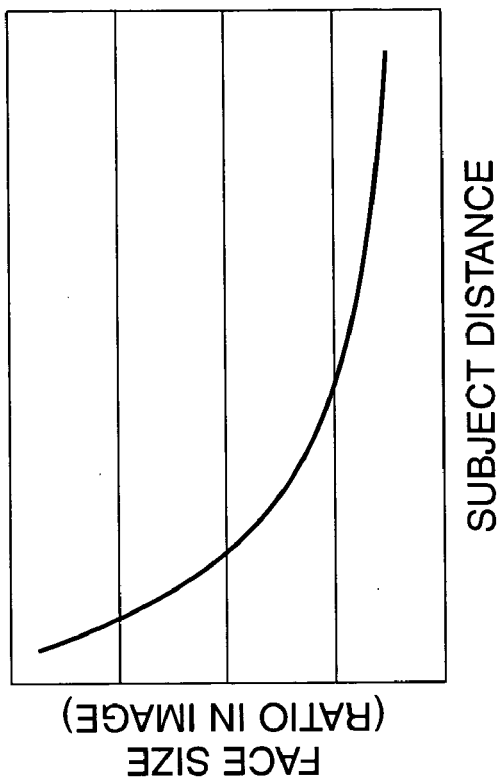
FIG. 3B is a graph showing a conversion table of the relationship between the subject distance and the size of a face of a person as a subject (ratio in an image), for use when the image pickup apparatus of FIGS. 1A and 1B estimates the subject distance.
Figure 3A:
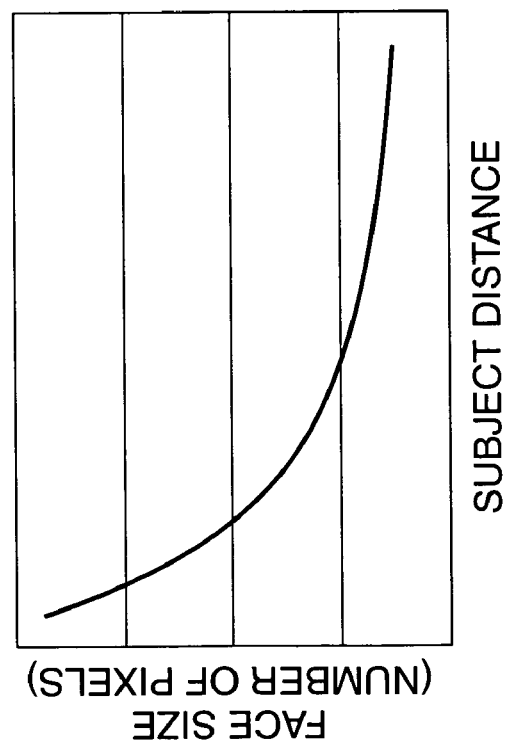
FIG. 3A is a graph showing a conversion table of the relationship between the subject distance and the size of a face of a person as a subject, for use when the image pickup apparatus of FIGS. 1A and 1B estimates the subject distance.

The subject distance estimating section 104 estimates the subject distance from the image pickup apparatus 100 to the subject based on the face size. Specifically, the subject distance estimating section 104 estimates the subject distance by referring to the face size (number of pixels) determined by the face size determining section 103 and a conversion table created based on a graph (FIG. 3A) showing the relationship between the face size (number of pixels) and the subject distance when the lens focal distance is 38 mm (wide-angle).

If the lens focal distance in zooming is not 38 mm, the conversion table is referred to using an integrated value of (38/lens focal distance (mm) in zooming) and (determined face size).

Figure 4:
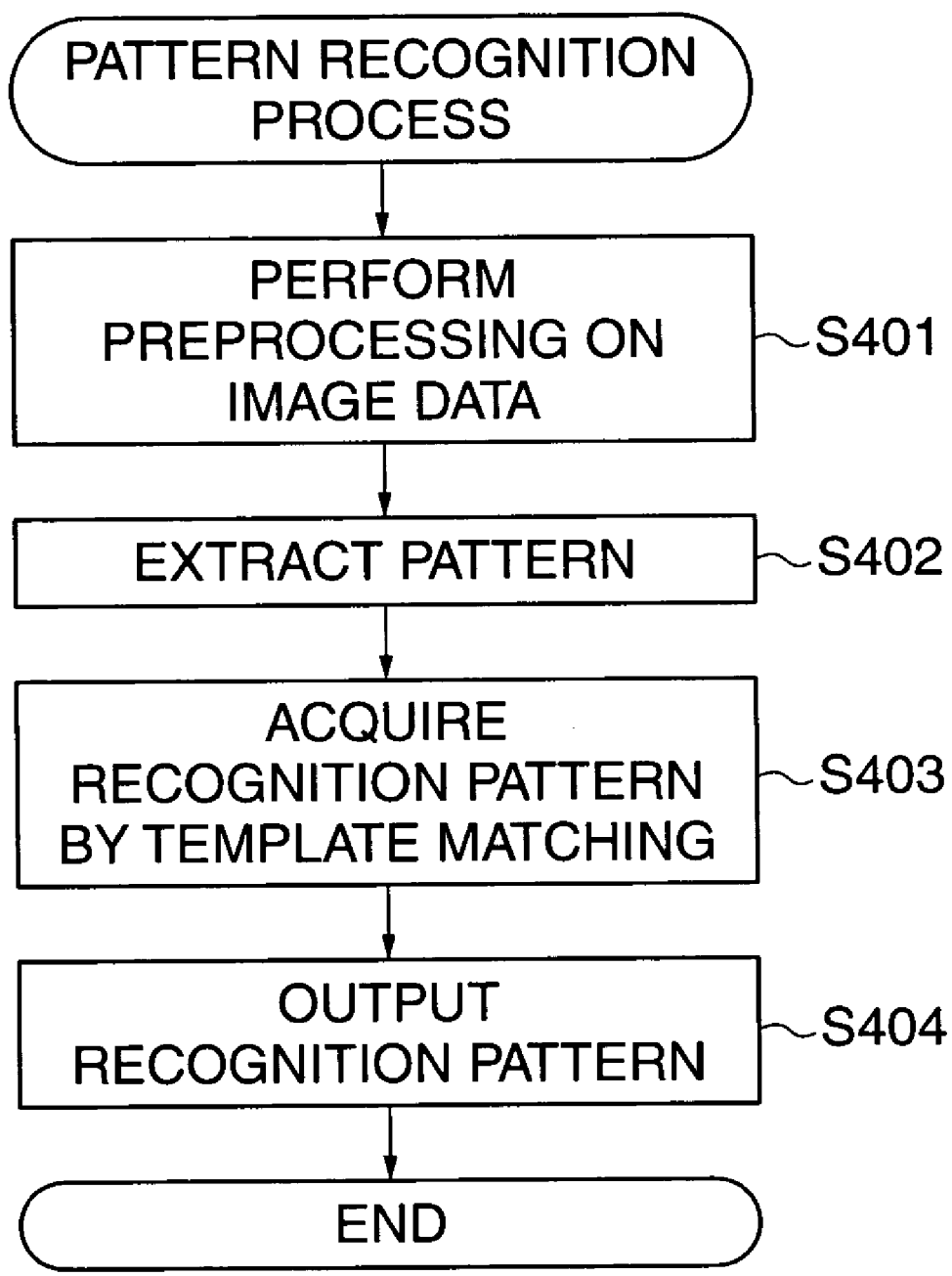
FIG. 4 is a flow chart showing a pattern recognition process carried out by the face information detecting circuit appearing in FIGS. 1A and 1B.

FIG. 4 is a flow chart showing the pattern recognition process carried out by the face information detecting circuit 102 appearing in FIG. 1B.

Figure 5:
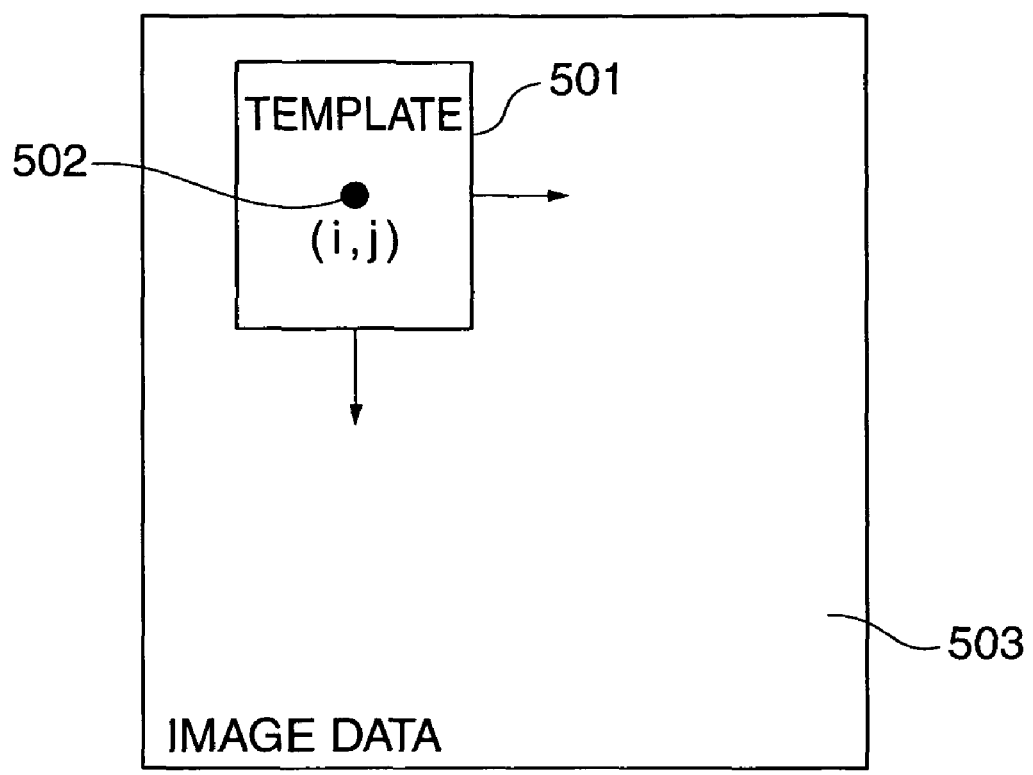
FIG. 5 is a diagram useful in explaining template matching as an example of matching performed in the pattern recognition process of FIG. 4.

FIG. 5 as well as FIG. 4 will be referred to in the following description.

As shown in FIG. 4, preprocessing is performed on image data 503 acquired from the image storage buffer 101a (step S401), and a pattern of a characteristic part is extracted from the preprocessed image data 603 on the face (step S402). The extracted pattern is matched with a template (standard pattern) 501 (template matching) to acquire a recognition pattern (step S403). The acquired recognition pattern is output to the face size determining section 103 (step S404), followed by termination of the pattern recognition process.

The above-mentioned template matching is performed as described below.

As shown in FIG. 5, first, a central point 502 of the template 501 is placed at a given coordinate point (i, j) on the acquired image data 503. While the central part 502 is being scanned, the degree of similarity in the overlap of the template 501 and the image data 503 is calculated to determine a position where the maximum degree of similarity is obtained. By matching the pattern extracted from the face image data 503 with the template 501 including the shape of eyes, ear, or the like, it is possible to acquire information on positions of the eyes, a face area (face coordinates), etc.

Figure 6:
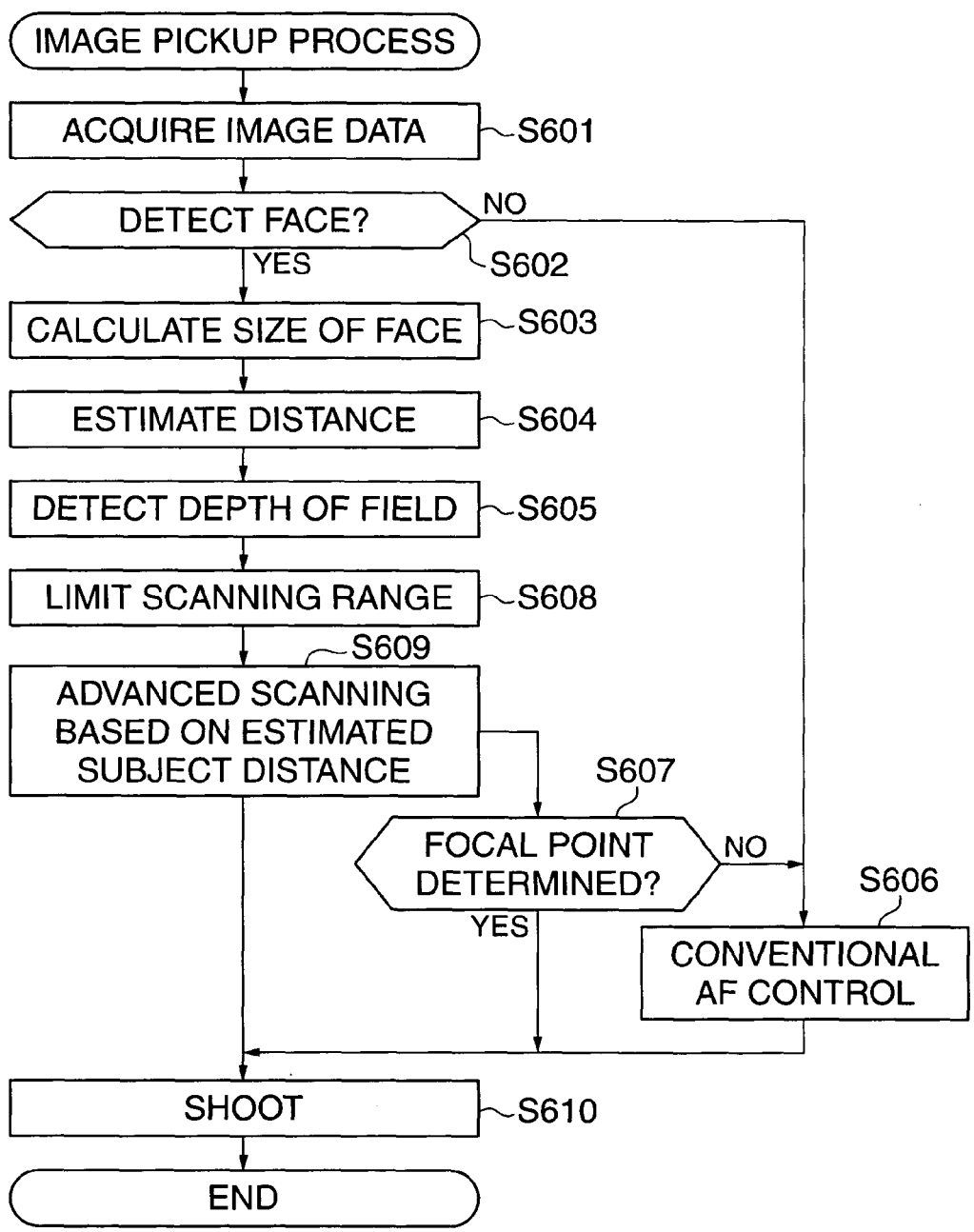
FIG. 6 is a flow chart showing an image pickup process carried out by the image pickup apparatus of FIGS. 1A and 1B.

FIG. 6 is a flow chart showing an image pickup process carried out by the image pickup apparatus of FIGS. 1A and 1B.

As shown in FIG. 6, first, the image pickup device 101 is caused to shoot a subject to acquire image data on the subject (step S601). Then, it is determined whether or not the face information detecting circuit 102 has detected face information from the acquired image data (step S602). If the face information detecting circuit 102 has detected face information, the AF controller 111 determines the face size based on the detected face information (step S603). The subject distance estimating section 104 estimates the subject distance based on the determined face size (step S604). Then, the depth of field is calculated based on the estimated subject distance, lens focal distance, and aperture value (step S605), and the automatic focusing range is limited according to the calculated depth of field (step S608) to drive the focus lens. A description will be given later of how to limit the automatic focusing range in the step S608.

Figure 7:
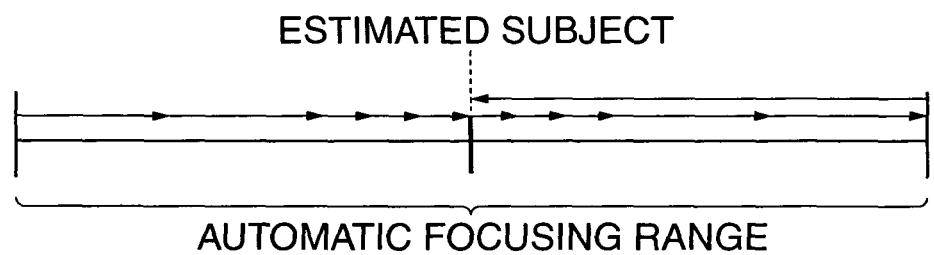
FIG. 7 is a diagram useful in explaining a method of controlling a focus lens for use in automatic focus scanning.

As shown in FIG. 7, after limiting the automatic focusing range, the AF controller 111 performs automatic focus (AF) scanning while moving the focus lens over a narrow range at and in the vicinity of the estimated subject distance and over a wide range in other areas (step S609). Then, if a focal position has been determined upon completion of the AF scanning over the automatic focusing range (step S607), the lens is driven to the focal position to perform shooting (step S610). If a focal position has not been determined (step S607), the automatic focusing range is extended to the whole area, and automatic focusing control is carried out by performing the AF scanning again or by phase difference AF or contrast AF (step S606) to perform shooting (step S610), followed by termination of the process.

If it is determined in the step S602 that the face information detecting circuit 102 has not detected face information from the acquired image data, automatic focusing control is carried out in the step S606 to perform shooting (step S610), followed by termination of the process.

Figure 8:
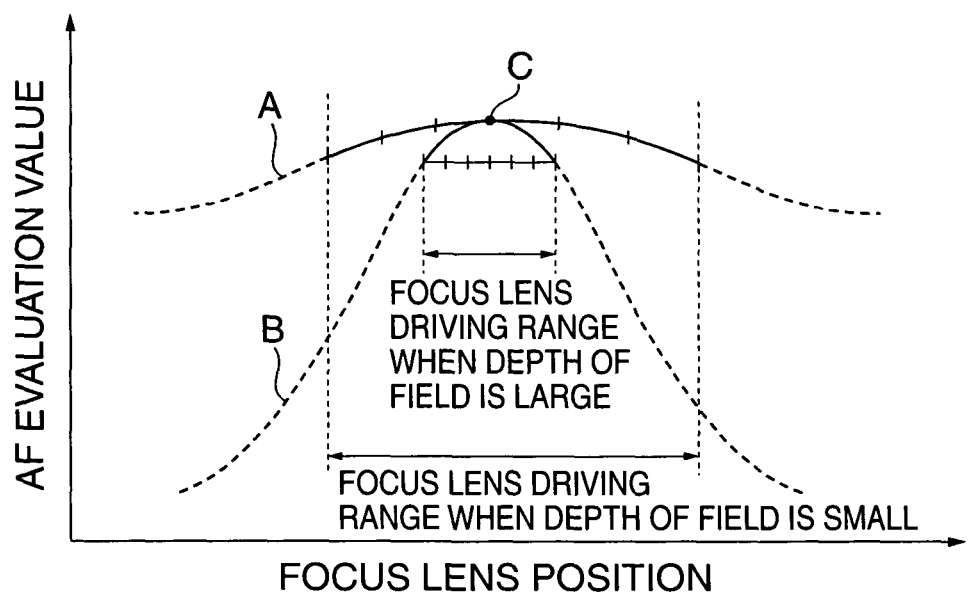
FIG. 8 is a diagram useful in explaining a method of limiting a focus lens driving range according to the depth of field.

Next, how to limit the automatic focusing range in the step S608 will be described with reference to FIG. 8. FIG. 8 is a diagram showing the relationship between the AF evaluation value and the focus lens position when the depth of field is large and when the depth of field is small. In FIG. 8, the ordinate indicates the AF evaluation value, and the abscissa indicates the focus lens position.

When the depth of field is large (see the curve A in FIG. 8), the AF evaluation value varies by a small amount with movement of the focus lens, and hence, if the focus lens moves over a narrow range, it is difficult to focus on the optimum focal point C; therefore, a focal point cannot be found unless AF evaluation values are detected from a wide automatic focusing range. In contract, when the depth of field is small (see the curve B in FIG. 8), the AF evaluation value varies by a large amount with movement of the focus lens, and hence, even if the focus lens moves over a narrow range, it is easy to focus on the optimum focal point C; therefore, a focal point can be found even if AF evaluation values are detected from a narrow automatic focusing range. For example, if the AF scanning range is set to be a predetermined multiple of the depth of field and an area at the estimated subject distance and its vicinity are set as the automatic focusing range, the automatic focusing range can be wide when the depth of field is large, and the automatic focusing range can be narrow when the depth of field is small.

Since AF scanning is thus performed while moving the focus lens over a wide range when the depth of field is large and moving the focus lens over a narrow range when the depth of field is small, the accuracy of automatic focusing can be improved and the time required for AF scanning can be reduced. Further, since the automatic focusing range is set to include the subject distance estimated by the subject distance estimating section 104 and to perform AF scanning concentratedly at and in the vicinity of the estimated subject distance, automatic focusing can be controlled in an efficient manner.

Figure 9A:
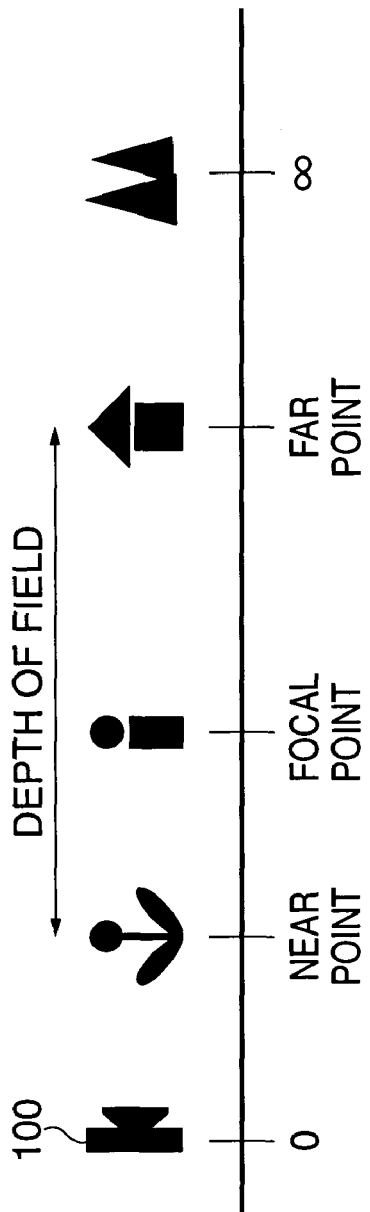
FIG. 9A is a diagram useful in explaining the depth of field for use in a determination carried out by an automatic focusing execution determining section appearing in FIGS. 1A and 1B, where the depth of field is normal.
Figure 9B:
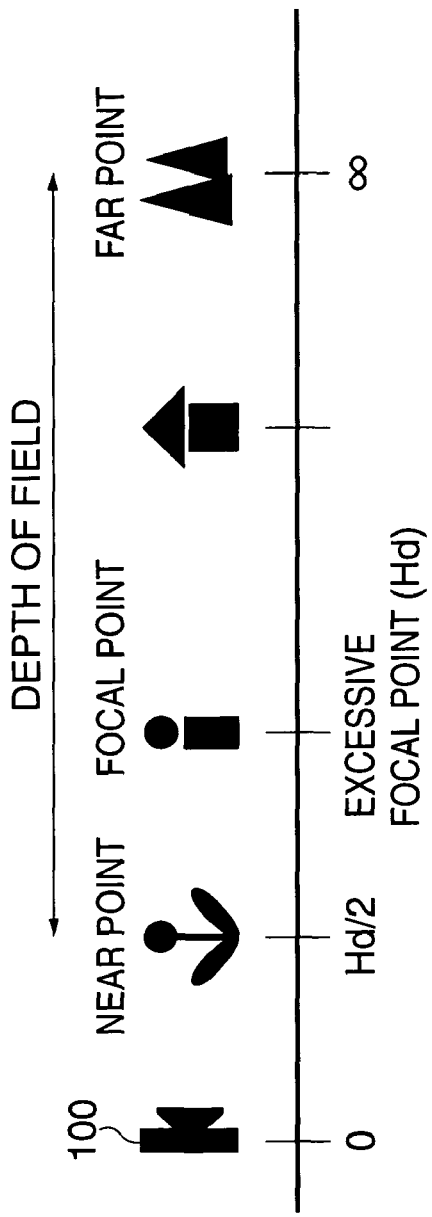
FIG. 9B is a diagram useful in explaining the depth of field for use in a determination carried out by the automatic focusing execution determining section in FIG. 1B, where the focal point corresponds to an excessive focal point.

Here, as shown in FIGS. 9A and 9B, the depth of field is the range between a near point and a far point determined according to the following equations (1) and (2) using the focal point distance corresponding to the estimated subject distance, lens focal distance, permissible circle of confusion, and aperture value:

Near point (depth to front side)=(excessive focal point distance ($Hd$)×focal point distance)/(excessive focal point distance ($Hd$)+focal point distance) (1)

Far point (depth to rear side)=(excessive focal point distance ($Hd$)×focal point distance)/(excessive focal point distance ($Hd$)−focal point distance) (2)

For example, if the excessive focal point coincides with the focal point as shown in FIG. 9B, a sharp image of the subject can be produced over the range from a mid-point (Hd/2) between a shooting or image pickup position (0) and the excessive focal point to the infinity. The excessive focal point distance increases as the lens focal distance increases and as the aperture value decreases. The mid-point (Hd/2) between the image pickup position (0) and the excessive focal point lies at the shortest distance to the depth of field, i.e. is a near point in the case where the excessive focal point coincides with the focal point.

The excessive focal point distance is determined according to the following equation (3):

Excessive focal point distance=(lens focal distance)$^2$/ (permissible circle of confusion×aperture value) (3)

Here, the circle of confusion means "blur tolerance" as the lower limit at which the subject is visible to the naked eye at a normal observation distance.

Although in the present embodiment, the depth of field used to limit the automatic focusing range and set the movement range of the focus lens is calculated based on the focal point distance corresponding to the subject distance estimated by the subject distance estimating section 104, lens focal distance, and aperture value, the present invention is not limited to this. For example, the subject distance (focal point distance) corresponding to the position of the focus lens is measured and stored in a memory at the factory, so that in the step S605, the focal point distance associated with the position of the focus lens in shooting the face in the step S601 is read out from the memory, and then the depth of the field is calculated based on the lens focal distance and aperture value.

Next, a second embodiment of the present invention will be described.

Figure 10B:
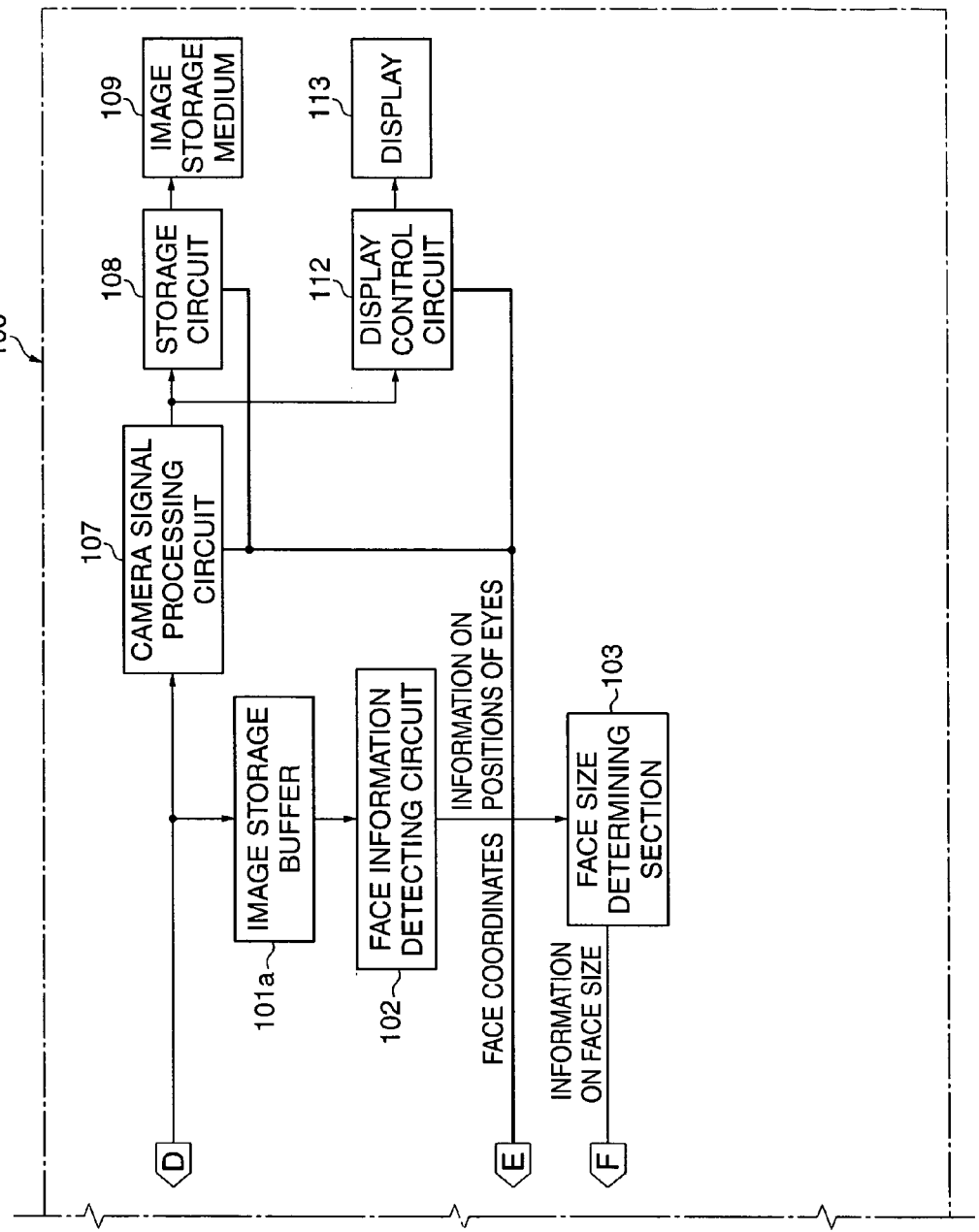

FIGS. 10A and 10B are block diagrams schematically showing the construction of an image pickup apparatus according to the second embodiment. Elements and parts corresponding to those of the first embodiment are denoted by the same reference numerals, and description thereof is omitted. In FIG. 10A, reference numeral 105 denotes an automatic focusing (AF) execution determining section which determines whether or not shooting is to be performed without executing automatic focusing or after executing automatic focusing with the automatic focusing range limited based on the subject distance estimated by the subject distance estimating section 104 and the lens focal distance and the aperture value output from the camera controller 110. The camera controller 110 has the built-in AF controller 111 which controls automatic focusing of the image pickup device 101 according to the result of determination carried out by the AF execution determining section 105, thus controlling the overall shooting operation of the image pickup apparatus 100.

The second embodiment differs from the first embodiment in that AF determination is carried out as to whether automatic focusing is to be performed or not, based on the estimated subject distance as well as the lens focal distance and the aperture value.

The operation of the image pickup apparatus according to the second embodiment will now be described with reference to FIG. 11.

Figure 11:
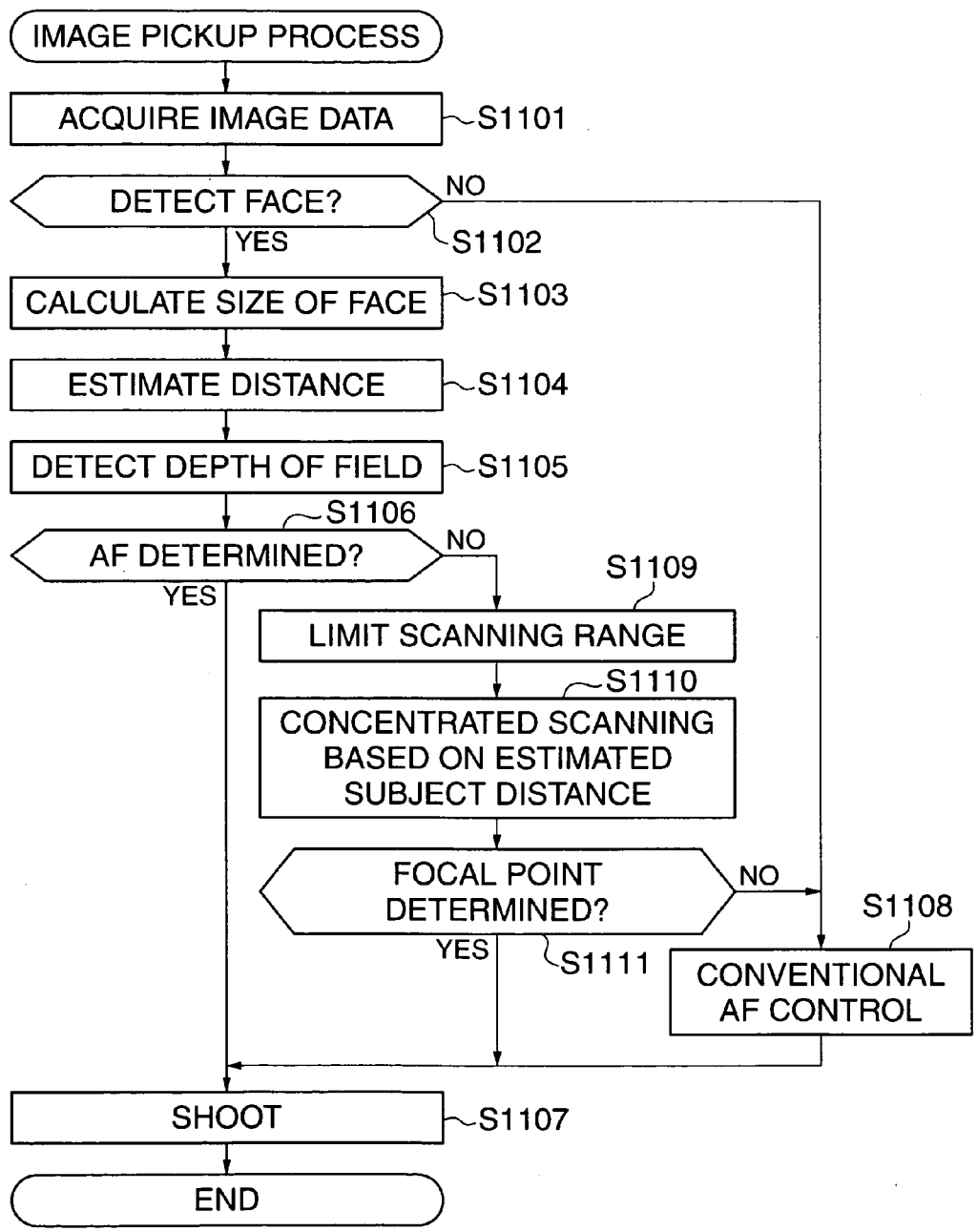
FIG. 11 is a flow chart showing an image pickup process carried out by the image pickup apparatus according to the second embodiment.

FIG. 11 is a flow chart showing an image pickup process carried out by the image pickup apparatus according to the second embodiment.

As shown in FIG. 11, first, the image pickup device 101 is caused to shoot a subject to acquire image data on the subject (step S1101). Then, it is determined whether or not face information has been detected from the acquired image data (step S1102). If face information has been detected, the face size is determined based on the detected face information (step S1103). The subject distance is estimated based on the determined face size (step S1104), and the depth of field is calculated based on the focal point distance corresponding to the estimated subject distance, as well as the lens focal distance and the aperture value (step S1105). The AF execution determining section 105 determines whether or not the focal point distance (in-focus distance that can be found from the position of the focus lens) under the shooting conditions in the step S1101 is within the calculated depth of field. If the focal point distance is within the calculated depth of field, automatic focusing is not executed, and if the focal point distance is not within the calculated depth of field, automatic focusing is executed (step S1106).

If it is determined in the step S1106 that shooting is to be performed without executing automatic focusing, shooting is performed without executing automatic focusing (step S1107), followed by termination of the process.

On the other hand, if it is determined in the step S1106 that automatic focusing is to be executed according to the estimated subject distance, the automatic focusing range is limited (step S1109), and scanning is carried out concentratedly on an area at the estimated subject distance and its vicinity (step S1110). As a result, the time required for executing automatic focusing can be reduced.

The automatic focusing range is determined based on the depth of field calculated from the focal point distance corresponding to the estimated subject distance, as well as the lens focal distance and the aperture value, or based on the depth of field under the shooting conditions in the step S1101.

As shown in FIG. 7, if the automatic focusing range is limited (step S1109), automatic focusing is performed while moving the focus lens over a narrow range at and in the vicinity of an area at the estimated subject distance and moving the focus lens over a wide range in other areas (step S1110). When the focal position is determined upon completion of the AF scanning over the automatic focusing range, the lens is driven to the focal position to perform shooting (step S1107).

It should be noted that if it is determined in the step S1111 that the subject is out of focus, the automatic focusing range is extended to the whole area, and the AF scanning is performed again or automatic focusing control by phase difference AF or contrast AF that has been conventionally in practical use is carried out (step S1108) to perform shooting (step S1107), followed by termination of the process.

If it is determined in the step S1102 that face information has not been detected from the acquired image data, the automatic focusing control in the step S1108 is carried out to perform shooting (step S1107), followed by termination of the process.

According to the process of FIG. 11, it is possible to carry out the AF determination based on the estimated subject distance by using the detected face information; if it is determined that automatic scanning is not required (YES to the step S1106), shooting is performed without executing automatic focusing (step S1107). Therefore, if automatic focusing is not required, shooting can be performed without executing automatic focusing, and hence the time required for automatic focus scanning can be reduced. Further, if it is determined that automatic scanning is required (NO to the step S1106), automatic focus scanning is executed according to the estimated subject distance, and hence automatic focusing can be controlled in an efficient manner.

Although in the present embodiment, whether automatic focusing is to be performed or not is determined according to whether or not the focal point distance (in-focus distance that can be found from the position of the focus lens) under the shooting conditions in the step S1101 is within the calculated depth of field, so that automatic focusing is not performed when the focal point distance is within the calculated depth of field, and automatic focusing is performed when the focal point distance is not within the calculated depth of field (step S1106), the present invention is not limited to this. For example, whether or not the subject distance estimated in the step S1109 is within the depth of field of the lens in shooting performed in the step S1101 may be determined, so that automatic focusing is not performed when the subject distance is within the depth of field of the lens, and automatic focusing is performed when the subject distance is not within the depth of field of the lens.

Next, a third embodiment of the present invention will be described.

Here, the operation of an image pickup apparatus according to the third embodiment will be described with reference to FIG. 12.

The construction of the image pickup apparatus according to the third embodiment is the same as that of the image pickup apparatus according to the second embodiment, and therefore description thereof is omitted with identical elements and parts denoted by identical reference numerals. The third embodiment differs from the first and second embodiments in that AF determination as to whether automatic focusing is to be performed or not is carried out based on the calculated field of depth under shooting conditions used for detecting face information, and the movement range of the lens is determined based on the estimated subject distance to perform automatic focusing.

Figure 12:
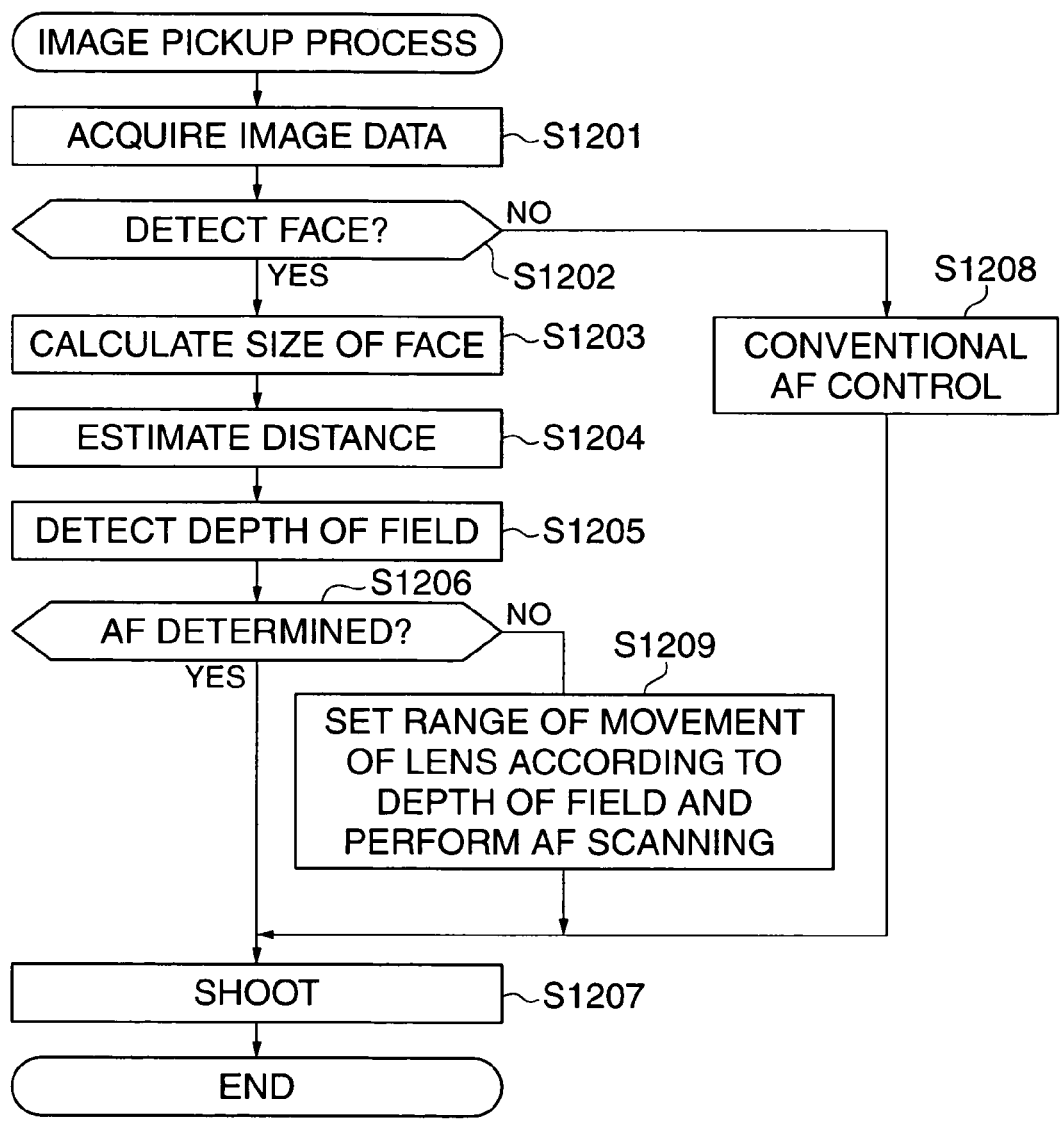
FIG. 12 is a flow chart showing an image pickup process carried out by an image pickup apparatus according to a third embodiment of the present invention.

FIG. 12 is a flow chart showing an image pickup process carried out by the image pickup apparatus according to the third embodiment.

As shown in FIG. 12, first, the image pickup device 101 is caused to shoot a subject to acquire image data on the subject (step S1201). It is determined whether or not face information has been detected from the acquired image data (step S1202). If face information has been detected, the face size is determined based on the detected face information (step S1203), and the subject distance is estimated based on the determined face size (step S1204). The automatic focusing execution determining section 105 carries out AF determination as to whether or not the estimated subject distance is within the depth of field calculated based on shooting conditions such as the subject distance, aperture value, and lens focal distance associated with the position of the lens in the step S1201 (step S1206).

If it is determined in the step S1206 that the estimated subject distance is within the depth of field under the shooting conditions in the step S1201, shooting is performed without executing automatic focusing (step S1207), followed by termination of the process.

On the other hand, if the estimated subject distance is not within the depth of field under the shooting conditions in the step S1201, it is then determined whether or not the depth of field calculated based on the focal point distance corresponding to the estimated subject distance, lens focal distance, and aperture value is large or small. When the depth of field is large because the lens focal distance is short or the aperture value is large relative to the estimated subject distance (see the curve A in FIG. 8), the AF evaluation value varies by a small amount with movement of the focus lens, and hence, if the focus lens moves over a narrow range, it is difficult to focus on the optimum focal point C; therefore, in the automatic focusing range around the optimum focal point C, AF scanning is performed by moving the focus lens over a wide range, and then shooting is performed. On the other hand, when the depth of field is small because the lens focal distance is long or the aperture value is small relative to the estimated subject distance (see the curve B in FIG. 8), the AF evaluation value varies by a large amount with movement of the focus lens, and hence, even if the focus lens moves over a narrow range, it is easy to focus on the optimum focal point C; therefore, in the automatic focusing range around the optimum focal point C, AF scanning is performed by moving the focus lens over a narrow range (step S1209), and then shooting is performed, followed by termination of the process.

The automatic focusing range is determined based on the depth of field calculated from the focal point distance corresponding to the estimated subject distance, lens focal distance, and aperture value, or based on the depth of field under the shooting conditions in the step S1201.

If it is determined in the step S1202 that face information has not been detected from the input image data, the automatic focusing range is extended to the whole area, and AF scanning is performed again or automatic focusing control by phase difference AF or contrast AF, which has been conventionally in practical use, is carried out to perform shooting (step S1208), followed by termination of the process.

According to the process of FIG. 12, if the estimated subject distance is within the depth of field under the shooting conditions in the step S1201 (YES to the step S1206), shooting is performed without executing automatic focusing (AF) (step S1207). Therefore, if automatic focusing is not required shooting can be performed without executing automatic focusing, and hence the time required for AF scanning can be reduced. Further, if the estimated subject distance is not within the depth of field under the shooting conditions in the step S1201 (NO to the step S1206), AF scanning is performed according to the depth of field (FIG. 8) (step S1209). As a result, automatic focusing can be controlled in an efficient manner.

Although in the present embodiment, the face size determining section 103 counts pixels in a face area (face coordinates) based on face information detected by the face information detecting circuit 102 and determines the face size based on the number of pixels, the present invention is not limited to this, but the face size may be determined based on the ratio of the face area in an image.

Although in the present embodiment, the subject distance is estimated by referring to the conversion table created based on the graph (FIG. 3A) showing the relationship between the face size (number of pixels) and the subject distance, the present invention is not limited to this, but the subject distance may be estimated by referring to a conversion table created based on a graph (FIG. 3B) showing the relationship between the ratio of subject's face area in an image and the subject distance.

It is to be understood that the object of the present invention may also be accomplished by supplying a system or an apparatus with a storage medium in which a program code of software, which realizes the functions of any of the above described embodiments is stored, and causing a computer (or CPU or MPU) of the system or apparatus to read out and execute the program code stored in the storage medium.

In this case, the program code itself read from the storage medium realizes the functions of any of the above described embodiments, and hence the program code and a storage medium on which the program code is stored constitute the present invention.

Examples of the storage medium for supplying the program code include a floppy (registered trademark) disk, a hard disk, a magnetic-optical disk, a CD-ROM, a CD-R, a CD-RW, a DVD-ROM, a DVD-RAM, a DVD-RW, a DVD+RW, a magnetic tape, a nonvolatile memory card, and a ROM. Alternatively, the program code may be supplied directly from a storage medium storing the program, or downloaded from another computer, a database, or the like connected to the Internet, a commercial network, a local area network, or the like.

Further, it is to be understood that the functions of any of the above described embodiments may be accomplished not only by executing a program code read out by a computer, but also by causing an OS (operating system) or the like which operates on the computer to perform a part or all of the actual operations based on instructions of the program code.

Further, it is to be understood that the functions of any of the above described embodiments may be accomplished by writing a program code read out from the storage medium into a memory provided in an expansion board inserted into a computer or a memory provided in an expansion unit connected to the computer and then causing a CPU or the like provided in the expansion board or the expansion unit to perform a part or all of the actual operations based on instructions of the program code.

Further, the form of the above program may be an object code, a program code executed by an interpreter, or script data supplied to an OS (Operating System).

As many apparently widely different embodiments of the present invention can be made without departing from the spirit and scope thereof, it is to be understood that the invention is not limited to the specific embodiments thereof except as defined in the appended claims.

CROSS REFERENCE TO RELATED APPLICATION

This application claims priority from Japanese Patent Application No. 2004-166342 filed Jun. 3, 2004, which is hereby incorporated by reference herein.

What is claimed is:

1. An image pickup apparatus comprising:
an image pickup device that shoots a subject to acquire image data on the subject;
a focus lens;
a controller that acquires a focusing condition of said focus lens for every position of said focus lens based on an output of said image pickup device, and controllably moves said focus lens to cause said image pickup device to perform automatic focusing, based on the acquired focusing condition;
a face information detecting device that detects information on a face of the subject from the acquired image data;
a distance estimating device that estimates a subject distance from said image pickup device to the subject based on the detected information on the face; and
a depth-of-field calculating device that calculates a depth of field,
wherein said controller performs a first detecting operation of determining a focusing condition of the focus lens by moving the focus lens over a predetermined range of movement of the focus lens when said face information detecting device does not detect the information on the face of the subject from the acquired image data, and performs a second detecting operation of determining a focusing condition of the focus lens by moving the focus lens over a narrower range of movement of the focus lens than the predetermined range of movement of the focus lens in accordance with the calculated depth of field, said narrower range including a position of the focus lens corresponding to the estimated subject distance, when said face information detecting device detects the information on the face of the subject from the acquired image data.

2. An image pickup apparatus according to claim 1, wherein the narrower range over which the focus lens is moved is wider as the depth of field is larger and is narrower as the depth of field is smaller.

3. An image pickup apparatus according to claim 1, wherein said controller controls a range of movement of said focus lens according to the depth of field.

4. An image pickup apparatus according to claim 1, wherein said controller provides control such that at and in a vicinity of a position of said focus lens at which said focus lens is focused at the estimated subject distance, a range over which said focus lens moves is made smaller.

5. An image pickup apparatus according to claim 1, wherein said controller inhibits execution of the automatic focusing when the estimated subject distance is within a focusing range under shooting conditions in acquiring the image data from which the information on the face has been detected.

6. An image pickup apparatus comprising:
an image pickup device that shoots a subject to acquire image data on the subject;
a focus lens;

a controller that acquires a focusing condition of said focus lens for every position of said focus lens based on an output of said image pickup device, and controllably moves said focus lens to cause said image pickup device to perform automatic focusing, based on the acquired focusing condition;

a face information detecting device that detects information on a face of the subject from the acquired image data;

a distance estimating device that estimates a subject distance from said image pickup device to the subject based on the detected information on the face; and a depth-of-field calculating device that calculates a depth of field, wherein said controller performs a first detection operation of determining a focusing condition of the focus lens by moving the focus lens over a predetermined range of movement of the focus lens when said face information detecting device does not detect the information on the face of the subject from the acquired image data, and performs a second detection operation of determining a focusing condition of the focus lens by moving the focus lens over a narrower range of movement of the focus lens than the predetermined range of movement of the focus lens in accordance with the estimated subject distance and the calculated depth of field when said face information detecting device detects the information on the face of the subject from the acquired image data.

7. An image pickup apparatus according to claim 6, wherein said controller provides control such that at and in a vicinity of a position of said focus lens at which said focus lens is focused at the estimated subject distance, a range over which said focus lens moves is made smaller.

8. An image pickup apparatus according to claim 6, wherein said controller inhibits execution of the automatic focusing when the estimated subject distance is within a focusing range under shooting conditions in acquiring the image data from which the information on the face has been detected.

9. An image pickup apparatus comprising:
an image pickup device that shoots a subject to acquire image data on the subject;
a focus lens;
a controller that acquires a focusing condition of said focus lens for every position of said focus lens based on an output of said image pickup device, and controllably moves said focus lens to cause said image pickup device to perform automatic focusing, based on the acquired focusing condition;
a face information detecting device that detects information on a face of the subject from the acquired image data;
a distance estimating device that estimates a subject distance from said image pickup device to the subject based on the detected information on the face; and
a depth-of-field calculating device that calculates a depth of field based on the estimated subject distance,
wherein said controller performs a first detection operation of determining a focusing condition of the focus lens by moving the focus lens over a predetermined range of movement of the focus lens when said face information detecting device does not detect the information on the face of the subject from the acquired image data, and performs a second detection operation of determining a focusing condition of the focus lens by moving the focus lens over a narrower range of movement of the focus lens than the predetermined range of movement of the focus lens in accordance with the calculated depth of field when said face information detecting device detects the information on the face of the subject from the acquired image data.

10. An image pickup apparatus comprising:
an image pickup device that shoots a subject to acquire image data on the subject;
a focus lens;
a controller that acquires a focusing condition of said focus lens for every position of said focus lens based on an output of said image pickup device, and controllably moves said focus lens to cause said image pickup device to perform automatic focusing, based on the acquired focusing condition;
a face information detecting device that detects information on a face of the subject from the acquired image data;
a distance estimating device that estimates a subject distance from said image pickup device to the subject based on the detected information on the face; and
a depth-of-field calculating device that calculates a depth of field based on a focal point distance at which the image data from which the information on the face has been detected was acquired,
wherein said controller performs a first detection operation of determining a focusing condition of the focus lens by moving the focus lens over a predetermined range of movement of the focus lens when said face information detecting device does not detect the information on the face of the subject from the acquired image data, and performs a second detecting operation of determining a focusing condition of the focus lens by moving the focus lens over a narrower range of movement of the focus lens than the predetermined range of movement of the focus lens in accordance with the calculated depth of field when said face information detecting device detects the information on the face of the subject from the acquired image data.

11. An image pickup method for an image pickup apparatus having an image pickup device that shoots a subject to acquire image data on the subject, and a focusing lens, the method comprising:
a control step of acquiring a focusing condition of said focus lens for every position of said focus lens based on an output of said image pickup device, and controllably moving said focus lens to cause said image pickup device to perform automatic focusing, based on the acquired focusing condition;
a face information detecting step of detecting information on a face of the subject from the acquired image data;
a distance estimating step of estimating a subject distance from the image pickup device to the subject based on the detected information on the face; and
a calculating step of calculating a depth of field,
wherein said control step performs a first detecting operation of determining a focusing condition of the focus lens by moving the focus lens over a predetermined range of movement of the focus lens when said face information detecting step does not detect the information on the face of the subject from the acquired image data, and performs a second detecting operation of determining a focusing condition of the focus lens by moving the focus lens over a narrower range of movement of the focus lens than the predetermined range of movement of the focus lens in accordance with the calculated depth of field, said narrower range including a position of the focus lens corresponding to the estimated subject distance, when said face information detecting step detects the information on the face of the subject from the acquired image data.

12. An image pickup method for an image pickup apparatus having an image pickup device that shoots a subject to acquire image data on the subject, and a focusing lens, the method comprising:
   a control step of acquiring a focusing condition of said focus lens for every position of said focus lens based on an output of said image pickup device, and controllably moving said focus lens to cause said image pickup device to perform automatic focusing, based on the acquired focusing condition;
   a face information detecting step of detecting information on a face of the subject from the acquired image data;
   a distance estimating step of estimating a subject distance from the image pickup device to the subject based on the detected information on the face; and
   a calculating step of calculating a depth of field,
   wherein said control step performs a first detection operation of determining a focusing condition of the focus lens by moving the focus lens over a predetermined range of movement of the focus lens when said face information detecting step does not detect the information on the face of the subject from the acquired image data, and performs a second detection operation of determining a focusing condition of the focus lens by moving the focus lens over a narrower range of movement of the focus lens than the predetermined range of movement of the focus lens in accordance with the estimated subject distance and the calculated depth of field when said face information detecting step detects the information on the face of the subject from the acquired image data.

13. An image pickup method for an image pickup apparatus having an image pickup device that shoots a subject to acquire image data on the subject, and a focusing lens, the method comprising:
   a control step of acquiring a focusing condition of said focus lens for every position of said focus lens based on an output of said image pickup device, and controllably moving said focus lens to cause said image pickup device to perform automatic focusing, based on the acquired focusing condition;
   a face information detecting step of detecting information on a face of the subject from the acquired image data;
   a distance estimating step of estimating a subject distance from the image pickup device to the subject based on the detected information on the face; and
   a calculating step of calculating a depth of field based on the estimated subject distance,
   wherein said control step performs a first detection operation of determining a focusing condition of the focus lens by moving the focus lens over a predetermined range of movement of the focus lens when said face information detecting step does not detect the information on the face of the subject from the acquired image data, and performs a second detecting operation of determining a focusing condition of the focus lens by moving the focus lens over a narrower range of movement of the focus lens than the predetermined range of movement of the focus lens in accordance with the calculated depth of field when said face information detecting step detects the information on the face of the subject from the acquired image data.

14. An image pickup method for an image pickup apparatus having an image pickup device that shoots a subject to acquire image data on the subject, and a focusing lens, the method comprising:
   a control step of acquiring a focusing condition of said focus lens for every position of said focus lens based on an output of said image pickup device, and controllably moving said focus lens to cause said image pickup device to perform automatic focusing, based on the acquired focusing condition;
   a face information detecting step of detecting information on a face of the subject from the acquired image data;
   a distance estimating step of estimating a subject distance from the image pickup device to the subject based on the detected information on the face; and
   a calculating step of calculating a depth of field based on a focal point distance at which the image data from which the information on the face has been detected was acquired,
   wherein said controller performs a first detection operation of determining a focusing condition of the focus lens by moving the focus lens over a predetermined range of movement of the focus lens when said face information detecting step does not detect the information on the face of the subject from the acquired image data, and performs a second detecting operation of determining a focusing condition of the focus lens by moving the focus lens over a narrower range of movement of the focus lens than the predetermined range of movement of the focus lens in accordance with the calculated depth of field when said face information detecting step detects the information on the face of the subject from the acquired image data.

* * * * *